United States Patent Office 3,574,797

Patented Apr. 13, 1971

3,574,797

PROCESS FOR MAKING 2-PHENOXY-4,5-DIBENZO-1-OXA-3-THIA-2-PHOSPHOLANES

James J. Hodan, Williamsville, and James L. Dever, Lewiston, N.Y., assignors to Hooker Chemical Corporation, Niagara Falls, N.Y.

No Drawing. Filed Aug. 31, 1967, Ser. No. 664,611
Int. Cl. C07d *105/04;* C08f *45/58;* A01n *9/36*
U.S. Cl. 260—973 11 Claims

ABSTRACT OF THE DISCLOSURE

A process for producing a novel compound of the formula:

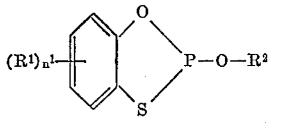

in which $R^2$ is selected from the group consisting of aryl and substituted aryl, in which $R^1$ is selected from the group consisting of alkyl, substituted alkyl, aryl, and substituted aryl, for example, and in which $n^1$ is from 0 to 4. Where $n^1$ is more than 1, the multiple substituents may be either the same or different. A compound of this type is useful as a bactericide. Additionally, a compound of this type is suitable for use as an intermediate in the synthesis of more complicated compounds, and as a polymer stabilizer.

This invention relates to a novel process for producing a compound especially suitable for use as an insecticide, and/or a bactericide, and/or a polymer stabilizer, and/or as a chemical intermediate.

BACKGROUND

In recent years, major advances have been made in the efficient production of mercaptophenols and substituted mercaptophenols. Accordingly, there is a continuing search for novel and useful compounds that can be prepared from mercaptophenols.

Similarly, although major advances have been made in recent years in the development of novel and efficient pesticidal compounds, there remains a great demand for the development of other novel insecticides having a high degree of effectiveness and a low toxicity to human beings.

Trivalent phosphorus esters of o-mercaptophenol are desirable because of their outstanding thermal and hydrolytic stability.

Accordingly, an object of this invention is a novel process for producing a phosphorus compound.

Other objects become apparent from the preceding and following disclosure.

THE INVENTION

The objects of this invention are obtained by a novel process for producing a compound, comprising heating a phenolic to from about 50° C. to about 250° C., preferably about 130° C. to about 180° C. and promptly thereafter adding about an equimolar amount of typically 4,5-benzo-2-halo-1-oxa-3-thia-2-phospholane (a compound described in copending application Ser. No. 645,873, filed June 14, 1967), or substituted forms thereof, while maintaining the temperature in the above-indicated range. At temperatures above about 180° C., a higher degree of degradation occurs in direct proportion to increase in temperature. When a phenolic reactant having a relatively low boiling point is employed, a lower reaction temperature should be employed. After addition of the phospholane, in this process, the reaction temperature is preferably maintained until reaction is substantially complete as evidenced by cessation of the evolution of hydrogen chloride. After an appropriate reaction period of about 1 to about 10 hours, preferably about 2 to about 3 hours, the mixture consists of essentially pure novel compound of this invention. If higher purity is required the reaction product may be distilled under vacuum. This process is advantageous in that it does not require the use of a base, requires no refrigeration, uses about equimolar amounts of reactants, and proceeds in high conversions.

The novel process described above may employ any phospholane of the formula:

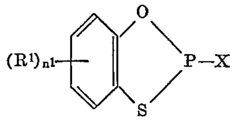

is reacted with a phenolic compound of the formula $R^2$—OH, preferably a phenol or substituted phenol of the formula:

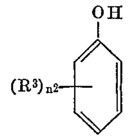

whereby a compound is produced of the formula:

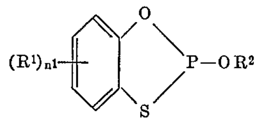

in which X is a halogen, preferably selected from the group consisting of chlorine, bromine and iodine, in which $R^2$ is selected from the group consisting of aryl, and substituted aryl, in which $R^1$ and $R^3$ are each selected from the group consisting of alkyl, substituted alkyl, aryl, and substituted aryl, for example, and in which $n^1$ and $n^2$ are each from 0 to 4. Where $n^1$ or where $n^2$ either are more than 1, the multiple substituents may be either the same or different. A compound of this type is useful as an insecticides. Additionally, a compound of this general type is suitable for use as an intermediate in the synthesis of more complicated compounds.

The above compounds of the resulting formula are effective stabilizers for polymers such as polypropylene, polyethylene, acrylonitrile-butadiene-styrene copolymer, polystyrene, and other like compounds.

Preferred compounds having generally good bactericidal properties are those compounds in which $R^2$ is an aryl such as phenyl.

The alkyl substituent for $R^1$ and $R^3$ values may be any conventional aryl or conventional alkyl such as methyl, ethyl, propyl, butyl, pentyl, hexyl, decyl, dodecyl, and the like.

Typical aryls referred to above include phenyls, substituted phenyl, polycyclic phenyls, naphthyls, substituted forms thereof, and the like.

Typical compounds representative of the compounds of the above generic formula produced by the process of this invention typically include:

2-phenoxy-4,5-benzo-1-oxa-3-thia-2-phospholane;
2-(nonylphenoxy)-4,5-benzo-1-oxa-3-thia-2-phospholane;
2-(p-t-butylphenoxy)-4,5-benzo-1-oxa-3-thia-2-phospholane;
2-(2,6-di-isopropylphenoxy)-4,5-benzo-1-oxa-3-thia-2-phospholane;
2-(2,4-di-t-butylphenoxy)-4,5-benzo-1-oxa-3-thia-2-phospholane;

2-(2,6-dimethylphenoxy)-4,5-benzo-1-oxa-3-thia-2-phospholane;

2-[(1-phenylethyl)phenoxy]-4,5-benzo-1-oxa-3-thia-2-phospholane;

2-(2,6-di-sec-butylphenoxy)-4,5-benzo-1-oxa-3-thia-2-phospholane;

2-(2,4-di-sec-amylphenoxy)-4,5-benzo-1-oxa-3-thia-2-phospholane; and 2-(octylphenoxy)-4,5-benzo-1-oxa-3-thia-2-phospholane.

Emulsifiable concentrates of compounds of present invention may be prepared according to known art, hence, the active component such as 2-phenoxy-4,5-benzo-1-oxa-3-thia-2-phospholane, is dissolved in an appropriate hydrocarbon solvent such as toluene or xylene to which is added either one or more emulsifying agents such as Emcol H–300 and/or Emcol H–500, each of these typical commercial emulsifying agents being blends of anionic and non-ionic emulsifiers designed for preparing emulsifiable concentrates of agricultural chemicals. The amount of emulsifying agent(s) added will depend on some extent to the degree of hardness present in the water to which the emulsifiable concentrate is to be added. A specific example of an emulsifiable concentrate composition is as follows:

| Component: | Parts |
|---|---|
| 2-phenoxy-4,5-benzo-1-oxa-3-thia-2-phospholane | 24 |
| Emcol H–500 | 1.6 |
| Emcol H–300 | 1.6 |
| Xylene | 48.0 |

The following examples are intended to illustrate the invention and do not limit the invention except to the extent that the appended claims are limiited or as otherwise stated. In the following examples, all percentages are by weight, and temperatures are expressed in degrees centigrade unless otherwise stated.

Example I.—2-(2,6-di-isopropyl phenoxy)-4,5-benzo-1-oxa-3-thia-2-phospholane

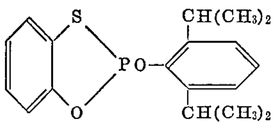

A 250 ml. flask was charged with 2,6-di-iso-propylphenol, 89.2 g. (0.5 mole). This was heated to 160° C. under $N_2$ and 95.3 g. (0.5 mole) of BCOTP (i.e., 4,5-benzo-2-chloro-1-oxa-3-thia-2-phospholane) was added dropwise in 0.45 hour at 155–160° C. After heating an additional hour at 155° C., the mixture was cooled under vacuum and the residue distilled to give 153.9 g. (93% conversion) of clear, colorless product, B.P. 135–137°, about 0.05 mm. having the following analysis:

*Analysis.*—Calc'd for $C_{18}H_{21}O_2PS$ (percent): C, 65.1; H, 6.4; P, 9.3; S, 9.7. Found (percent): C, 65.3; H, 6.4; P, 9.5; S, 9.0.

Example II.—2-(2,4-di-t-butylphenoxy)4,5-benzo-1-oxa-3-thia-2-phospholane

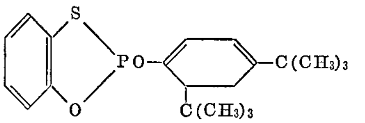

A 250 ml. flask was charged with 103.2 g. (0.5 mole) of 2,4-di-t-butyl phenol. This was heated to 160° C. under $N_2$ and then 95.3 g. (0.5 mole) of BCOTP was added dropwise in 0.65 hour at 160–165° C. After heating one hour at 165° C., the mixture was cooled under vacuum and distilled to give 165.9 g. (92% conversion) of clear, colorless product, B.P. 143–147°, about 0.2–0.05 mm. having the following analysis:

*Analysis.*—Calc'd for $C_{20}H_{25}O_2PS$ (percent): C, 66.6; H, 7.0; P, 8.6; S, 8.9. Found (percent): C, 66.5; H, 6.9; P, 8.6; S, 9.1.

Example III.—2-(2,6-dimethylphenoxy)-4,5-benzo-1-oxa-3-thia-2-phospholane

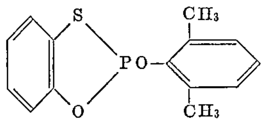

A 250 ml. flask was charged with 73.3 g. (0.6 mole) of 2,6-dimethylphenol. This was heated to 160° under $N_2$ and 111.4 g. (0.6 mole) of BCOTP was added dropwise in 0.5 hour at 155–165°. After heating two hours at 160°, the mixture was cooled under vacuum and distilled to give 149.3 g. (90% conversion) of clear, colorless product, B.P. 114–115°, about 0.05 mm., having the following analysis:

*Analysis.*—Calc'd for $C_{14}H_{13}O_2PS$ (percent): C, 60.8; H, 4.8; P, 11.2; S, 11.6. Found (percent): C, 61.4; H, 4.8; P, 11.5; S, 11.0.

Example IV.—2-[(1-phenylethyl)phenoxy]-4,5-benzo-oxa-3-thia-2-phospholane

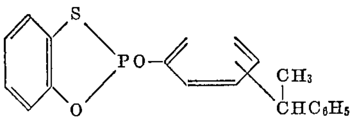

A 500 ml. flask was charged with 146.9 g. (0.74 mole) of monostyrenated phenol. This was heated to 165° under $N_2$ and 141.0 g. (0.74 mole) of BCOTP was added dropwise in 0.7 hour at 160–165°. After heating two hours at 160°, the mixture was cooled under vacuum and distilled to give 216.3 g. (83% conversion) of clear, colorless product, B.P., 172–175°, about 0.05 mm., having the following analysis:

*Analysis.*—Cal'd for $C_{20}H_{17}O_2PS$ (percent): C, 68.1; H, 4.9; P, 8.8; S, 9.1. Found (percent): C, 68.0; H, 4.9; P, 8.8; S, 9.3.

Example V.—2-phenoxy-4,5-benzo-1-oxa-3-thia-2-phospholane

A 500 ml. flask was charged with 94.1 g. (1.0 mole) of phenol. This was heated to 145° under $N_2$ and 190.6 g. (1.0 mole) of BCOTP was added dropwise in one hour at 140–145°. After heating two hours, the mixture was cooled under vacuum and distilled to give 209.4 g. (84% conversion) of clear, colorless product, B.P. 172–175°, about 0.04 mm., having the following analysis:

*Analysis.*—Cal'd for $C_{12}H_9O_2PS$ (percent): P, 12.5; S, 12.9. Found (percent): P, 12.5; S, 12.7.

Example VI.—2-(2,6-di-sec-butylphenoxy)-4,5-benzo-1-oxa-3-thia-2-phospholane

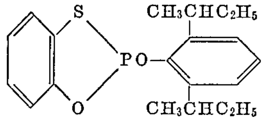

A 500 ml. flask was charged with 154.7 g. (0.75 mole) of 2,6-di-sec-amyl phenol. This was heated to 160° under $N_2$ and 143.0 g. (0.75 mole) of BCOTP was added dropwise in 0.7 hour at 155–160°. After heating two hours at 160–165°, the mixture was cooled under vacuum and distilled to give 240.5 g. (89% conversion) of clear, colorless product, B.P., 142–144°, about 0.05 mm., having the following analysis:

*Analysis.*—Cal'd for $C_{20}H_{25}O_2PS$ (percent): P, 8.6; S, 8.9. Found (percent): P, 8.7; S, 8.9.

Example VII.—2-(2,4-di-sec-amylphenoxy)-4,5-benzo-1-oxa-3-thia-2-phospholane

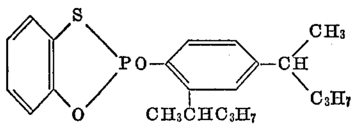

A 500 ml. flask was charged with 156.2 g. (0.6 mole) of 2,4-di-sec-amylphenol. This was heated to 155° under $N_2$ and 127.1 g. (0.67 mole) of BCOTP was added dropwise in 0.5 hour at 150–160°. After heating at 160–170° for two hours, cooled under vacuum and distilled to give 230.5 g. (89% conversion) of clear, colorless product, B.P. 152–155°, 0.05 mm., having the following analysis:

*Analysis.*—Cal'd for $C_{22}H_{29}O_2PS$ (percent): P, 8.0; S, 8.3. Found (percent): P, 8.0; S, 8.3.

Example VIII.—2-(octylphenoxy)-4,5-benzo-1-oxa-3-thia-2-phospholane

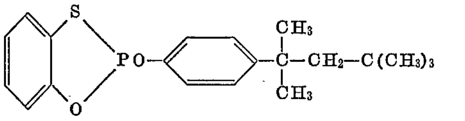

A 500 ml. flask was charged with 154.8 g. (0.75 mole) of octylphenol. This was heated to 160° under $N_2$ and then 143.0 (0.75 mole) of BCOTP was added dropwise in 0.6 hour at 155–160°, cooled under vacuum, and distilled to give 238.6 g. (89% conversion) of clear, colorless product, B.P. 169–173°, about 0.25–0.2 mm., having the following analysis:

*Analysis.*—Cal'd for $C_{20}H_{25}O_2PS$ (percent): P, 8.6; S, 8.9. Found (percent): P, 8.5; S, 8.9.

Example IX

For various miscellaneous compounds of this invention, tests were conducted and the results thereof illustrate the utility of the compounds as stabilizers for polymers such as polypropylene.

The data supporting this utility was obtained using a Brabender Plasticorder which is widely accepted in the plastics industry as a laboratory duplicator of plastics plant processing. This instrument graphs changes in torque of a polymer melt with time under processing conditions. The torque is directly related to the viscosity of the polymer melt. Changes in viscosity have long been used as an indication of polymer degradation. When degradation occurs by cross-linking the viscosity and torque increase with degradation and when degradation occurs by chain breaking, the viscosity and torque decrease with degradation. In the case of polypropylene, the torque decreases with degradation as evidenced by the values indicated in the attached table of results where no stabilizer was added. Initially, the torque was 760 meter-grams and after fifteen minutes, had dropped to 105 m.-g. All the readings in the table are 15 minute readings because they offered the most convenient comparison point with unstabilized polypropylene. All values in the table were obtained using an EH–6 measuring head with mixing set at 100 r.p.m. and a bowl temperature of 190° C. The stabilizer was added at a 1% load level to unstabilized polypropylene and the mixture pre-blended before introduction to the mixing bowl. The results are illustrated in the following Table I, for the stabilization of polypropylene with

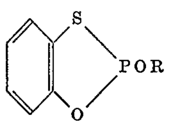

| R value | 15 minute torque reading, meter=G |
|---|---|
| No Stabilizer, control | 105 |
| 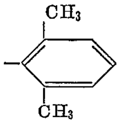 | 675 |
| 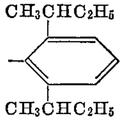 | 615 |
| 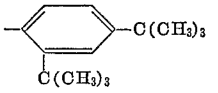 | 625 |
| 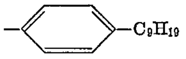 | 710 |
| 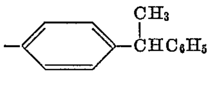 | 675 |
| 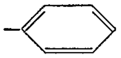 | 740 |
| 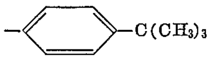 | 640 |
| 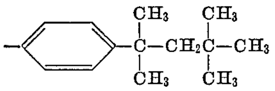 | 660 |
| 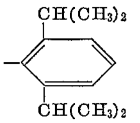 | 635 |

Example X

For various miscellaneous compounds of this invention, tests were conducted and the results illustrate the utilities as bactericides, and insecticides, as follow.

For the following illustrated test results, the abbreviations are employed as shown in Table II.

TABLE II

[*E. c.=Escherichia coli; P. p.=Pseudomonas phaseolicola; S. a.=Staphylococcus aureus; X. p.=Xanthomonas phascoli; A. c.=Aphis fabea* Scop.—contact; *A. s.=Aphis fabae* Scop.—systemic; *MBB=Epilachna varivestis* Muls.]

| | |
|---|---|
| Compound I | Ethyl thiocatechol (cyclic) phosphite $[(C_6H_4OS)PO\text{-}C_2H_5]$. |
| Compound II | Methyl thiocatechol (cyclic) phosphite $[(C_6H_4OS)PO\text{-}CH_3]$. |
| Compound III | Phenyl thiocatechol (cyclic) phosphite $[(C_6H_4OS)PO\text{-}C_6H_5]$. |

For each of the tests against *E. coli, P. p., S. aureus,* and *X. p.*, the "Boyce Thompson" procedure was employed, in which the compound rate is expressed in parts of the compound per million. The results are listed as scale of 0 (zero) to 3, where zero indicates no growth of bacteria and 3 indicates heavy growth.

The Mexican Bean Beetle Test was as follows. Primary leaves of lima bean plants are excised and dipped into solutions containing the chemicals. The leaves are allowed to dry by placing the petiole in water using 50 ml. flasks. After they are dry, they are transferred to paper cups inserting the petiole through a small hole at the bottom of the cup. The petiole is then kept immersed in water to prevent wilting of the treated leaf. The cup serves then as a chamber for the leaf, into which 5 larvae (fourth instar) of the Mexican Bean Beetle (*Epilachna varivestis*

Muls.) are inserted. The cup is covered with a Petri plate top to prevent escape of the insects. Primary tests are made at 1000 p.p.m. and the chemicals formulated as for the aphid test using 5 ml. acetone and 0.01% Triton X–155. Mortality of the larvae is recorded after 48 hours.

Sevin is used as standard insecticide for the test.

For the spray test (insecticides), ten-day-old Nasturtium plants are infested with black bean aphids, (*Aphis fabae* Scop.) so that the two first leaves have from 50 to 100 aphids. The infested plants are then sprayed on a turntable with 100 ml. of the chemical solution. Primary tests are made at 1000 p.p.m. (0.1 g. dissolved in 5 ml. acetone emulsified with 95 ml. 0.01% Triton X–155). Each plant is then caged in a Plexiglas piece of tubing supported by a thin aluminum plate and filter paper. The inside of the tube is coated with talcum powder to prevent escape of the aphids. Mortality is then recorded by counting the number of dead aphids and percent mortality determined from the total number. Malathion or Zectran is used as standard fungicide.

The results for each respective rate of the particular compound against each of several particular and separate bacteria and insects are illustrated in Table III.

TABLE III

| Compound employed | *S. a.* | | | | *E. c.* | | | | *P. p.* | | | | *X. p.* | | | | *MBB* | *A. c.* | *A. s.* |
|---|---|---|---|---|---|---|---|---|---|---|---|---|---|---|---|---|---|---|---|
| | Rate | | | | | | | | | | | | | | | | | | |
| | 255 | 76 | 38 | 19 | 255 | 76 | 38 | 19 | 255 | 76 | 38 | 19 | 255 | 76 | 38 | 19 | 1,000 | 1,000 | 1,000 |
| | Results obtained per rate, below | | | | | | | | | | | | | | | | | | |
| I | 0 | 0 | 0 | 3 | 0 | 1 | 3 | 3 | 0 | 0 | 2 | 3 | 0 | 0 | 0 | 3 | | | |
| II | 0 | 0 | 0 | 0 | 0 | 0 | 0 | 3 | 0 | 0 | 0 | 2 | 0 | 0 | 0 | 0 | | | 44 |
| III | 0 | 0 | 0 | 0 | 0 | 0 | 1 | 3 | 0 | 0 | 0 | 2 | 0 | 0 | 1 | 3 | | | |

From Table III, it is illustrated: (1) that Compound I exhibits relatively good bactericidal properties; (2) that Compound II exhibits good bacterial properties, and some insecticidal properties; and (3) that the compound III exhibits good bactericidal properties.

It is to be understood that the specification, including the Examples, are only illustrative of the invention claimed herein and that it is within the scope of this invention to employ equivalence obvious to one skilled in the art. Any limitations appearing in the preceding disclosure are not intended to limit this invention except insofar as the limitations are stated to be important or otherwise appear in the amended claims.

What is claimed:

1. A process comprising reacting in the absence of a base a phenolic compound with a compound of Formula I

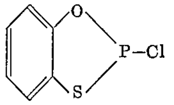

at a temperature of 50° C. to about 250° C. to produce a compound of Formula II

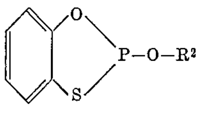

in which $R^2$ is selected from the group consisting of phenyl, mono or di-substituted phenyl wherein said substituents are alkyl of 1 to 12 carbon atoms, and alkyl of 1 to 12 carbon atoms substituted by phenyl.

2. The process of claim 1 wherein the phenolic reactant is of Formula III

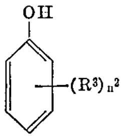

in which $R^3$ is selected from the group consisting of alkyl of 1 to 12 carbon atoms and alkyl of 1 to 12 carbon atoms substituted by phenyl; and $n^2$ is from 0 to 2.

3. The process of claim 1 wherein the reactants are used in about an equimolar ratio.

4. The process of claim 1 wherein $R^2$ is phenyl.

5. The process of claim 1 wherein $R^2$ is phenyl substituted by alkyl of 1 to 12 carbon atoms.

6. A process according to claim 1 in which said phenolic compound is preheated before said reacting with said compound of Formula I.

7. A process according to claim 1 in which said reaction temperature is maintained for at least about one hour.

8. A process according to claim 7 in which the reaction temperature ranges from about 130° C. to about 180° C.

9. A process according to claim 8 in which said reaction temperature is maintained for at least about two hours.

10. A process according to claim 7 in which the reaction temperature ranges from about 130° C. to about 180° C.

11. A process according to claim 10 in which said reaction temperature is maintained for at least about two hours.

References Cited

UNITED STATES PATENTS 2,728,789 12/1955 Morris et al. ______ 260—976X
3,006,946 10/1961 Lanham __________ 260—973X CHARLES B. PARKER, Primary Examiner A. H. SUTTO, Assistant Examiner U.S. Cl. X.R.

260—45.95, 937; 424—209